Oct. 16, 1934.  W. L. MORRIS  1,976,957
HIGH PRESSURE LUBRICATING SYSTEM
Original Filed March 11, 1929    4 Sheets-Sheet 1
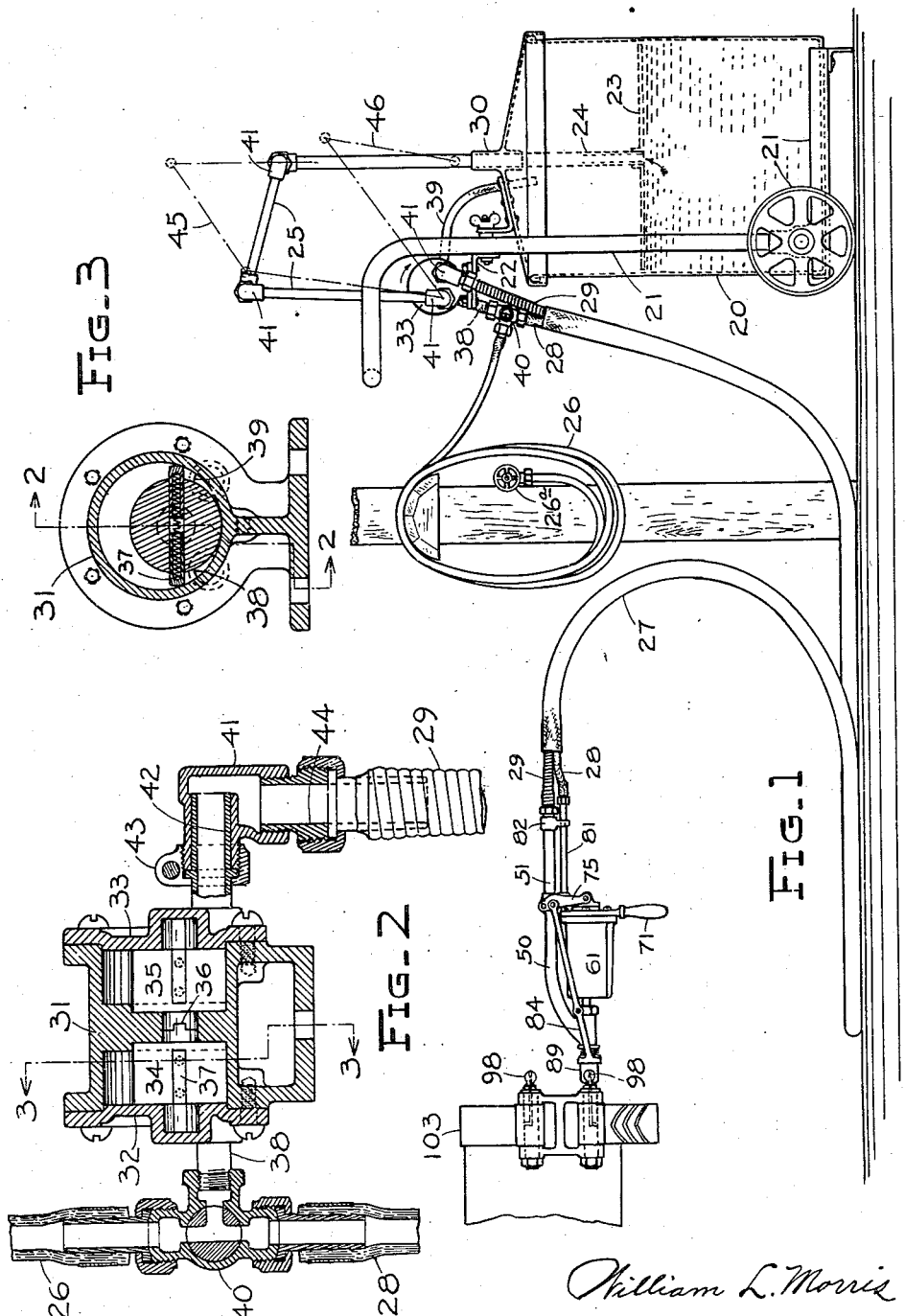

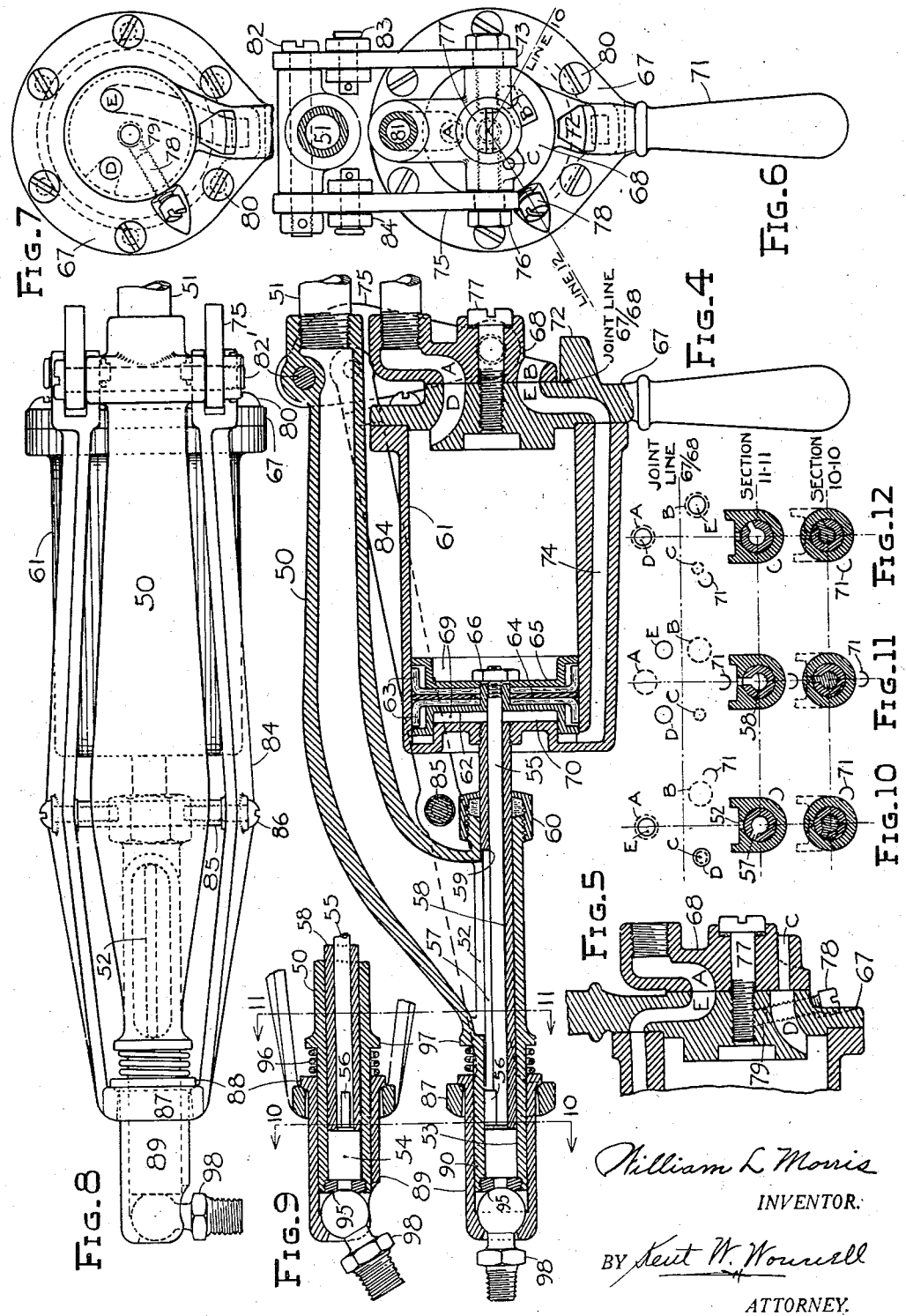

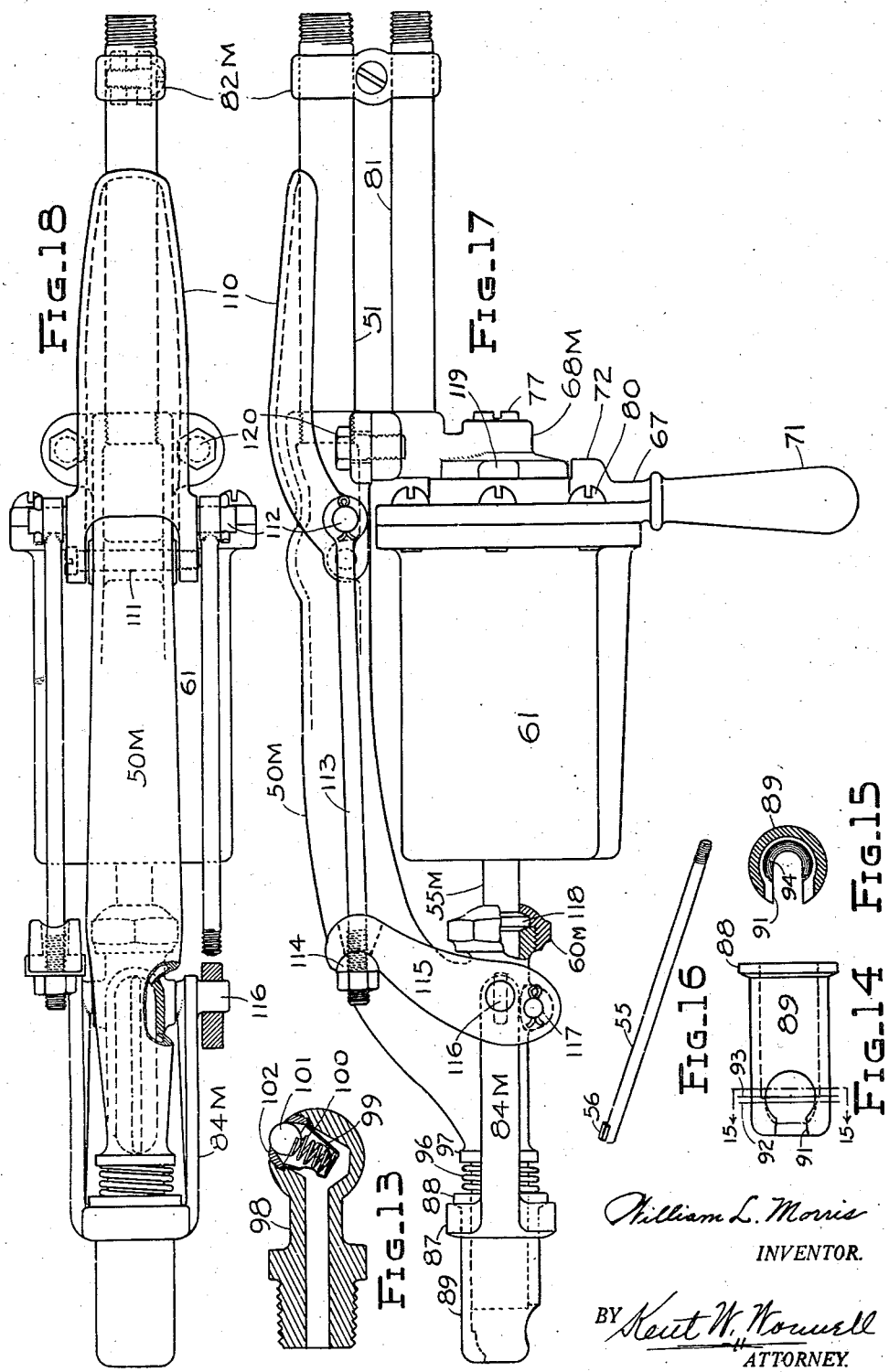

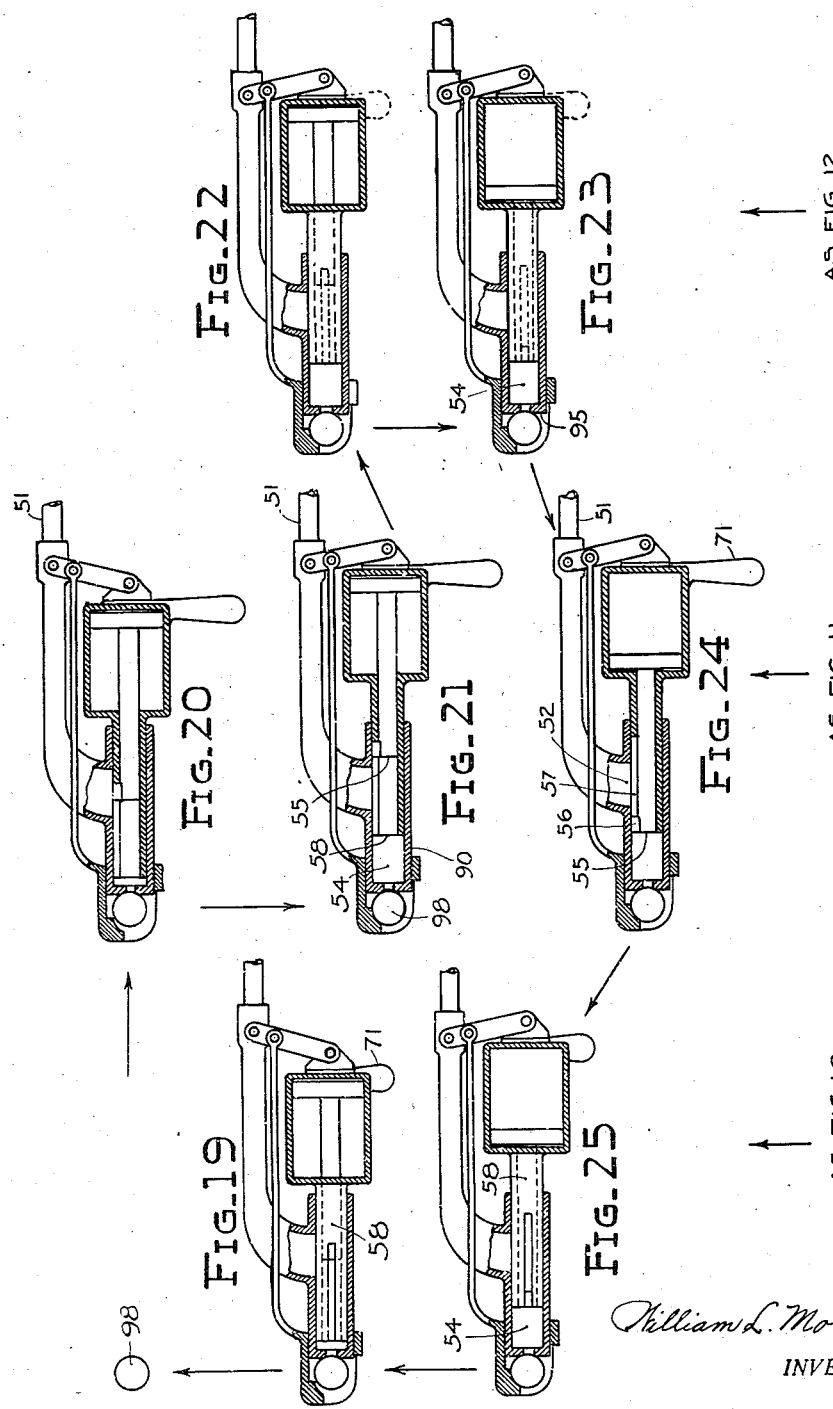

Patented Oct. 16, 1934

1,976,957

UNITED STATES PATENT OFFICE 1,976,957

HIGH PRESSURE LUBRICATING SYSTEM

William L. Morris, Chicago, Ill., assignor, by mesne assignments, to The Lubrication Corporation, South Bend, Ind., a corporation of Delaware Application March 11, 1929, Serial No. 346,115
Renewed September 16, 1933

25 Claims. (Cl. 221—47.4)

This invention relates in general to a high pressure lubricating system and may be otherwise described as a lubricant booster system.

One of the principal objects of the invention is in the provision of means for withdrawing lubricant such as grease, heavy oil and the like from an open receptacle or from a container without pressure, to advance it under low pressure to the place where it is used in a "shot" or slug under high pressure.

A further object of the invention is to provide means for quickly attaching and detaching the high pressure feeder from suitable fittings for receiving the grease, and by the act of attaching and detaching the feeder in automatically applying high pressure to the grease.

Other and further objects of the invention will appear hereinafter, the accompanying drawings illustrating a preferred embodiment of apparatus comprising a system for carrying out the invention.

In the accompanying drawings, Fig. 1 illustrates a complete system of portable lubricant storage, a low pressure air driven pump to take lubricant from storage and deliver it through a flexible hose to the high pressure location, an air driven booster pump, and a readily detachable connection for application to any one of many spherical head fittings located at the different bearings of mechanism to be lubricated; Fig. 2 is a section on the line 2—2 of Fig. 3 through the air driven low pressure lubricant pump; Fig. 3 is a section on the line 3—3 of Fig. 2; Fig. 4 is a vertical longitudinal section of the air driven high pressure booster pump with the cylinder head in lubricant compressing position; Fig. 5 is a sectional detail showing the air ports of the cylinder head in lubricant suction position; Fig. 6 shows the head end of the cylinder with the air points correctly located in the non-rotatable air valve cap; Fig. 7 is an end view of the air cylinder head showing the air ports correctly positioned therein; Fig. 8 is a top view of the pressure booster; Fig. 9 is a plan section of like parts shown in Fig. 4, the ball tip connector having its lubricant entrance port at a different angle; Fig. 10 is a diagrammatic view showing in the lower section the position of the lubricant sleeve discharge port as taken on the line 10—10 of Figs. 4 and 9 and above this the lubricant suction port taken on the line 11—11 of Figs. 4 and 9 and at the top the air port taken on the joint line 67/68 of Fig. 4, all as in the lubricant suction position, as shown in Fig. 5; Fig. 11 is a similar diagrammatic view of the same set of portings with the control handle in a vertical position, as shown in Fig. 6, with all air ports closed but with the low pressure lubricant open to the sleeve valve; Fig. 12 is a diagrammatic view of the same set of portings in the position of forcing in the lubricant under pressure, the air ports being diagrammatically shown on the section line in Fig. 4; Fig. 13 is an enlarged section of one of the spherical head bearing connectors with the port at an angle of 60°, Fig. 4 showing an angle of zero°, Fig. 8, 90°, and Fig. 9, 30°; Fig. 14 shows a pull-up sleeve with a U-shaped end opening for engaging and passing over the spherical head connector; Fig. 15 is a section taken on the line 15—15 of Fig. 14; Fig. 16 is a perspective of the lubricant plunger; Fig. 17 is a side view of a modified form of lubricant pressure booster having independent manual clamping means for attachment to spherical head fittings; Fig. 18 is a plan view of the modification shown in Fig. 17; Figs. 19 to 25, inclusive, are diagrammatic views showing the different positions of the parts assumed in applying, using and removing the booster pump.

A successful high pressure lubricant feeder has many refinements that are neither necessary nor actually used in pumping lubricant under lower pressure, and the features shown and described are to serve the new purpose of making high pressure lubricant feeding both possible and practicable.

Among the desirable features to be covered in a high pressure lubricant feeder are the following: the connecting bearing nipple must be of a form to stand very high tension at the joint to avoid leakage; pressure on the flexible hose leading to the booster must be light to avoid early destruction and leakage of lubricant; pressure must be applied to lubricant as close as possible to the bearing to avoid loss of capacity due to the compression of entrained air carried with the lubricant; intermittent pressure applications through a flexible hose should be avoided as they cause loss of quantity due to the elasticity of the hose; a heavy high pressure hose is expensive and cumbersome to handle, causing loss of time; lubricant should be shot into the bearing at an extremely high pressure and under the highest possible velocity so that the lubricant will be under high pressure as it enters the bearing and before it has had time to ooze out it will cover the bearing; to avoid waste and permit high pressure a fixed amount of lubricant must be fed at each manual operation, and the feeding automatically stopped; the operation of the feeder should cause a suction on the joint between the bearing nipple and the feeder in disconnecting, to avoid leakage and waste; the manual operation of the feeder should be away from the restricted and obstructed parts of the mechanism to which attachment is made and the hands of an operator should not change position on the parts of the feeder in attaching, forcing in the lubricant and refilling the feeder, thereby saving time and effort.

The mechanical operation of the clamping device and the filling of voids in the booster and in the supply pipes with lubricant should be by some method other than using lubricant from the high pressure ram, as each cubic inch of lubricant displacement requires about 100 cubic inches of compressed air, making a very cumbersome and power-wasting booster if these light duties are performed with the extremely high pressures.

This booster system contemplates using, say 100 pounds pressure for the pump which would fill the voids, and possibly 100 times this pressure 10,000 pounds for the hydraulic ram.

No adjusting features are required to take up the wear of the attaching clamp or to meet varying sizes of attachment as the surplus travel allowed for the plunger and sleeve valve take up these variations. This is not the case with the modified form shown in Figs. 17 and 18 in which the clamping travel is limited and the attachments must be close to the same size, the wear being taken up by the nuts on the pull rods.

Referring more particularly to the drawings, the system in general is shown in Fig. 1 and comprises a lubricant container 20 mounted on a wheel truck 21 having a shelf 22 for supporting a low pressure pump which is shown in more detail in Figs. 2 and 3.

In the lubricant container 20 a suction plate 23 rests upon the lubricant and fits loosely in the container. At the center of the plate is a suction pipe 24 extending through the plate so that a suction opening is provided at the under side of the plate. Connecting the upper end of the vertical pipe 24 with the low pressure pump are suction pipes 25 which have swivel joints at their ends, as shown in detail in Fig. 2, to permit the suction plate 23 to rise and fall in following the lubricant. The suction pipe 24 attached to the suction plate 23 is free to slide vertically in guide 30 at the top of the container 20.

As shown in Figs. 2 and 3, the body of pump 31 has two similar caps 32 at the air end of the pump and 33 at the lubricant end. In the pump an air rotary member 34 drives a lubricant rotor 35 by means of a tongue and groove connection 36 between them. Each of the rotors have spring pressed valve vanes 37 for making a connection in the eccentric chamber of the pump in which its rotor is movable. Each cap 32 and 33 has two openings, the cap 32 having an air pressure opening for a fitting 38 and an air exhaust opening 39; and the cap 33 having a lubricant suction opening from one of the pipes 25 and a lubricant discharge opening for the grease members 29.

The general air supply and hose are indicated in Fig. 1 with the numeral 26, and a canvas or other suitable hose covering 27 encloses an air hose 28 and a grease hose 29 which extends from the low pressure pump to the booster. An air valve 40 controls the admission of air under pressure from the air supply hose 26 through the fitting 38 and also to the air hose 28 which extends through the hose covering 27 to the lubricant booster.

Each of the lubricant swivel connections between the pipes 24 and 25 comprises an end fitting 41 and a swivel shoulder nipple 42 fitting therein which is held upon its ground fitting face by a split clamp nut 43. At the end of grease hose 29 is a threaded end fitting 44 for connecting the hose to the pump. In Fig. 1 the broken outline 45 represents the positions of the section pipes 24 and 25 when the suction plate 23 is at the highest elevation in the container 20 and the broken outline 46 indicates their positions when the suction plate is at its lowest level.

The booster pump connected to the air and grease hoses 28 and 29 in Fig. 1 is shown in detail in Figs. 4 to 16. A tubular body 50 has a lubricant supply pipe 51 connected to the lubricant supply hose 29 and a discharge slot 52 at the other end communicating with a cylindrical bore 53, at one end of which is a cavity or space 54 called the high compression chamber.

A lubricant plunger 55 also shown in Fig. 16 has a projection 56 at one end that travels in and closes a slot 57 in a sleeve valve 58 rotatable in the bore 53 for producing high compression in the chamber 54. Slot 57 ends at a point 59 in Fig. 4, and the plunger 55 is placed in the sleeve 58 from the other or compression end. A stuffing box nut 60 closes leakage around the sleeve 58 but permits the sleeve to be rotated and moved endwise with respect to the fitting 50.

At the end of the plunger 55 is an air cylinder 61, one end of which has an integral head directly attached to the sleeve valve 58 with a piston disk 62 attached to the end of plunger 55 and having cup leathers 63, a dividing washer 64, and a clamp disk 65 drawn up tight with a nut 66 for making a fluid-tight connection with the interior of the air cylinder 61. The piston disks 62 and 65 are extended at their edges to bear against the cylinder so that they will guide the piston without undue strains on the plunger 55.

An outer ported head 67 and an air valve cap 68 have their ports arranged around their circumferences, as shown in Figs. 6, 7, 10, 11 and 12, but to more clearly indicate the relationship of inlet and outlet, the sections have been brought around to a common plane in both Figs. 4 and 5. Port A is the air inlet, port B is the large air outlet, and port C is the small air outlet, all in the non-rotatable air valve cap 68. Port D communicates with the outer or lubricant pressure side of the piston and port E opens to the inner or suction side of the piston through a passage 74 both ports being located in the outer head 67. The port C is made smaller than the port B to retard the light loaded piston while taking its lubricant from the chamber 54, and the piston has air cushion pockets 69 for engaging with end projections 70 within the air cylinder 61 to prevent a metallic impact at the ends of the stroke.

A handle 71 is attached to the outer head 67 and travels from line 12, as shown in Fig. 6, which corresponds with the position of the parts shown in Figs. 4 and 12, to line 10 in which position the parts are as shown in Figs. 5 and 10. When the handle is positioned as shown in Fig. 6, the position of the parts is represented by Figs. 7 and 11, all air ports being closed, the lubricant port 57 being open in one passage and closed in return.

Projecting from the head 67 is a stop 72 which engages with the lower ends 73 of levers 75 attached to the air cap 68 and limiting the travel of the handle 71 to lines 10 and 12.

Air valve cap 68 is attached to the two levers 75 with pivot screws 76 and to the head 67 with a screw 77 which is threaded into the head 67 and locked in place with a set screw 78 and a soft plug 79 as shown more clearly in Figs. 5 and 7. The head 67 is attached to the cylinder 61 with screws 80.

Air is admitted to the air valve cap through a pipe 81 which makes a connection with the flexible air hose 28, as shown in Fig. 1. The outer end of the air pipe 81 slides freely in a support 82 secured to or surrounding the lubricant supply pipe 51.

The upper end of the levers 75 are pivoted at the ends of a pivot pin 82' which extends through and is supported at the end of the tubular body 50 (see Figs. 4 and 6). Between the pivot pins 76 and 82' of lever 75 are two pivot pins 83 to which are connected the two legs of a U-shaped pulling member 84. The sides of this pull member are opened up where they pass the inner end of the cylinder, and a compression strut 85 is placed between with attaching screws 86 to prevent it from closing in under heavy tension. At the joining end of the pull member is a cylindrical hub 87 which bears against shoulder 88 of the pull-up sleeve 89 which slides on the projecting end 90 of the tubular body 50. This sleeve 89 has a U-shaped opening 91 at its outer end, as shown in Figs. 9, 14 and 15 for receiving a spherical head lubricant receiving attachment shown in section in Fig. 13. As shown in Fig. 14, the center of the spherical internal end support bearing is on a line 92 and the entrance opening for the spherical attachment head is on a line 93 thereby insuring a line of bearing 94, as shown in Fig. 15, which is more than a half circle and prevents the attachment from slipping toward the opening 91 when compressed at its bearing 94.

At the projecting end 90 of the tubular body 50 there is a joint face disk 95 for making a lubricant-tight joint on an attachment head, as shown in Fig. 13. A light spring 96 disposed between a shoulder 97 of the body 50 and a shoulder 88 of the sleeve 89 serves to hold the attachment clamp normally open. In a side opening of the attachment, as shown in Fig. 13, a cage 99 carries a spring 100 which holds a ball check 101 to its seat 102. Two of these attachments 98 are shown in Fig. 1 as applied to a mechanism 103 such as an automobile chassis which may comprise a large number of such attachments with openings in the head at all conceivable angles and locations.

Figs. 9 and 19 to 25 show the pull-up sleeve 89 as drawn toward the bearing disk 95 with a spherical attachment 98 between them by pressure from the low pressure pump 31 delivered to the chamber 54 located between the seat 95 and the end of sleeve and plunger 58 and 55, the pressure being multiplied by the levers 75 on a ratio of about four to one. The modification shown in Figs. 17 and 18 has a separate hand clamping lever 110 which is pivoted on a pin 111 with projecting ends 112 for operating pull rods 113 having swivel ends 114 to bear against the ends of levers 115. These levers 115 engage projecting pin ends 116 of lug extensions of the pull-up member 84m and are pivoted upon a pin 117 supported in a boss extending from the body 50m. In this case the pull-up member is much shorter than that shown in Fig. 4. A sleeve valve 55m does not travel endwise, as shown in Fig. 4, and to take this end thrust a collar 118 is formed on the sleeve 55 and the stuffing box nut 60 in Fig. 4 is changed to a ground joint shoulder bearing coupling nut 60m. An air valve cap 68m has projecting stop lugs 119 used instead of the ends 73 of levers 75, as shown in Fig. 6, and the holding screws 120 secure the cap 68m to the body 50m. A pipe end support 82m is in the form of two half clamps as the pipe 81 does not have an end movement as required in the form shown in Figs. 1 and 4. The operation of this high pressure booster is as follows: a portable lubricant storage receptacle and truck 20 and 21 together with the air and lubricant hose enclosed in the flexible casing 27 and the booster pump at its end are moved to the location of a mechanism to be lubricated, the air supply hose 26 being either located or connectible at different stations to different air valves 26a. Ordinarily the air valve 40 is left open to allow three connections, the air being controlled at the valve 26a. Container 20 may be the drum in which the lubricant is shipped and held on the truck 21 by the special cover which is secured to the truck.

In moving the booster from one attachment 98 to another, the booster handle 71 should be in an angular position, as shown in Figs. 10 and 19, and if desired may be held releasably in this position by any suitable means. In handling the booster pump one hand is placed upon pipes 51 and 81 and the other hand upon the handle 71 remaining in these positions through all operations. The pull sleeve 89 at the feeding end of the booster is rotated upon the nozzle end 90 of the body 50 so that its attachment entrance or opening 91, as shown in Figs. 14 and 15, may be at the top, side, bottom, or in any other position to engage the attachments.

In Figs. 19 to 25 are shown diagrammatically the operating positions of the parts longitudinally while the ports are positioned with the handle 71 so that they assume the positions shown in Figs. 10, 11 and 12; Fig. 19 shows the arrangement of the parts after their movement by pressure with the handle 71 directed away from a vertical center line when changing the booster from a filled bearing attachment to the next one to be supplied (indicated by the circle designated by the arrow above Fig. 19) and as indicated by the three sets of portings on the vertical line of Fig. 10; Fig. 20 shows the arrangement of the parts after moving the handle to a vertical position as indicated by the three sets of portings on the vertical line and just before the lubricant enters from the low pressure supply pipe 51, as shown in Figs. 1 and 4 and before parts have moved; Fig. 21 shows the position of the parts as altered by the inflow of lubricant through the pipe 51, the clamping of the attachment 98 which is shown as a circle and being effected by pressure in chamber 54 exerted against the end of the sleeve valve 58 and the plunger 55 while the booster nozzle 90 is held against the attachment 98, and as pressure increases at the joint face which bears against the attachment the pull together on the joint between the attachment and the booster is multiplied to avoid leakage; Fig. 22 shows the position of the parts corresponding with Fig. 12 on the vertical line through the three sets of portings with the handle 71 at an angle and in front of the center line of the section just before the high pressure ram starts its movement; Fig. 23 shows the position of the parts after the piston and the ram have forced lubricant into the bearing attachment under very high pressure, the pressure in the chamber 54 simultaneously raising the pressure on the engaged joint face of the disk 95; Fig. 24 shows the position of the parts corresponding with that shown on the vertical line through the three portings in Fig. 11 and although the handle 71 stands vertically with the air ports shut off, as in Fig. 21, the plunger 55 with its head end 56 is at the inner end of the slot 57 and shuts off any flow of lubricant from its supply 51, making the return passage by the port 52 inoperative when moving from Fig. 23 to 25; Fig. 25 shows the position of the parts corresponding with Fig. 10 on the vertical line through the three portings just before the piston has started to withdraw the plunger 55; and Fig. 19 shows the position of the parts corresponding with that indicated by the vertical line of Fig. 10, but showing the plunger withdrawn and filling the bore of sleeve valve 58 by sucking lubricant out of the chamber 54, thereby drawing the sleeve valve 58 toward the attachment face and opening the clamp from the attachment so that the booster can be removed and placed upon another attachment 98 for feeding lubricant to it.

It should be understood that the low pressure pump 31 shown in Figs. 2 and 3 withdraws lubricant from the receptacle 20 and feeds it to the booster under the pressure for which it is adapted and also that it brings the lubricant in the feeding line up to such a pressure that a balance is created between the air and lubricant sides of the pump so that a balance is created controlled entirely by the air pressure and therefore starting, stopping and changing its speed to increase the pressure of the lubricant as this balance is altered by the feeding of lubricant from the booster.

The operation of the booster pump is to place it on an attachment 98 with the handle 71 in position as indicated on the line 10 of Fig. 6 when the parts are in the position shown in Fig. 19, and while holding it in contact with the attachment, to move the handle to vertical position, then in the opposite direction to the line 12 of Fig. 6, as indicated in the position shown in Fig. 22 and then back to the line 10 of Fig. 6 where it is ready to be removed and engaged with the next attachment.

A slight deviation in the alignment of the openings between the booster and the attachment 98 is immaterial as the disk 95 covers an excess of surface around the attachment port to provide a considerable free movement as it is desirable to avoid straining the end of the attachment 98.

I claim:

1. In a high pressure lubricant feeding system, means for injecting lubricant at high pressure into elements to be lubricated, said means including a pump having relatively movable pressure generating members and a pair of relatively movable clamping members adapted to embrace a lubricant receiving element, and force multiplying means for connecting the pressure members with the clamping members whereby the reaction of the pressure members is augmented and utilized to actuate the clamping members.

2. In a high pressure lubricant feeding system, means for injecting lubricant at high pressure into elements to be lubricated, said means including a pump having relatively movable pressure generating members and a pair of relatively movable clamping members adapted to embrace a lubricant receiving element, means for connecting the pressure members with the clamping members whereby the reaction of the pressure members actuates the clamping members, and means for admitting grease at low pressure into the pump the pressure of which causes the pressure members to close the clamping members on the receiving element.

3. In a high pressure lubricant feeding system, means for injecting lubricant at high pressure into elements to be lubricated, said means including a pump having relatively movable pressure generating members and a pair of relatively movable clamping members adapted to embrace a lubricant receiving element, means for connecting the pressure members with the clamping members whereby the reaction of the pressure members actuates the clamping members, means for admitting grease at low pressure into the pump the pressure of which causes the pressure members to close the clamping members on the receiving element, and means for thereafter actuating the pump whereby the clamping members are tightened on the receiving element and lubricant is forced therein under high pressure.

4. In a high pressure lubricant feeding system, means for injecting lubricant at high pressure into elements to be lubricated, said means including a pump having relatively movable pressure generating members and a pair of relatively movable clamping members adapted to embrace a lubricant receiving element, means for connecting the pressure members with the clamping members whereby the reaction of the pressure members actuates the clamping members, means for admitting grease at low pressure into the pump the pressure of which causes the pressure members to close the clamping members on the receiving element, and means for thereafter actuating the pump whereby the clamping members are tightened on the receiving element and lubricant is forced therein under high pressure, said grease supply being cut off during the retraction of the pump members whereby said retraction is effective to separate the clamp members.

5. In a high pressure lubricant feeding system, a lubricant pump having a nozzle adapted to cooperate with a lubricant receiving nipple, and a reciprocatory element for ejecting lubricant through said nozzle, a fluid motor having a reciprocatory element for actuating said lubricant ejecting element and means for clamping the nozzle to a nipple operated by the reaction from the operating forces of the reciprocatory elements of the lubricant pump and fluid motor.

6. In a high pressure lubricant feeding system, a lubricant pump including a cylinder and piston, and having a nozzle adapted to cooperate with a lubricant receiving nipple, a fluid motor including a cylinder and piston for actuating said pump piston, a lever pivotally connected at its ends to the cylinders of said pump and motor respectively, and means for clamping said nozzle to a nipple, said means being pivotally connected to an intermediate point of said lever whereby the reaction on the motor and pump cylinders of the pump operating pressure is caused to actuate the clamping means.

7. A lubricant feeding pump comprising a nozzle having a lubricant port, a sleeve valve and a plunger movable therein for receiving and discharging lubricant through said nozzle, a fluid pressure piston and cylinder connected directly to the plunger and valve and movable relatively to the nozzle, a clamping attachment fitting movable on the nozzle, and pressure multiplying means connected between the attachment fitting and the cylinder for holding the fitting in place in accordance with the pressure on the lubricant within the nozzle.

8. In a high pressure lubricating system, a source of lubricant supply under low pressure, a booster pump connected with said source, power means for operating said pump, said pump being provided with a discharge nozzle and clamping means cooperating therewith to make lubricant-tight connections with elements to be lubricated, and means for operating said clamping means by said low pressure lubricant through said booster pump.

9. In a high pressure lubricating system, a source of lubricant supply under low pressure, a booster pump connected with said source, power means for operating said pump, said pump being provided with a discharge nozzle and clamping means cooperating therewith to make lubricant tight connections with elements to be lubricated, and means for operating said clamping means initially by said low pressure lubricant through said booster pump and thereafter by the high pressure lubricant in said booster pump.

10. In a high pressure lubricating system, a source of lubricant supply under low pressure, a booster pump, said pump being provided with a discharge nozzle and clamping means cooperating therewith to make lubricant tight connections with elements to be lubricated, means for operating said clamping means initially by said low pressure lubricant and thereafter by the high pressure lubricant in said booster pump, and a unitary device for controlling said operating means and the injection of lubricant by said pump.

11. In combination, a high pressure lubricating gun having a discharge nozzle rigid therewith, clamping means adapted to form a lubricant tight connection between the rigid nozzle and elements to be lubricated, a source of lubricant supply under low pressure, a flexible conduit for conveying lubricant under low pressure to said gun, and means actuated by the lubricant pressure in the gun for operating the connecting clamping means.

12. In combination, a fluid pressure operated pressure booster lubricant gun having a discharge nozzle rigid therewith, means adapted to form a lubricant tight connection between the rigid nozzle and elements to be lubricated, a source of lubricant supply under low pressure, flexible means for supplying the gun with a fluid motive power and with lubricant, and means actuated by the lubricant pressure in the gun for operating the connecting means.

13. In combination, a manually controlled pressure booster lubricant gun having a discharge nozzle rigid therewith, means adapted to form a lubricant tight connection between the rigid nozzle and an element to be lubricated, a source of lubricant supply under low pressure, flexible means for supplying the gun with motive power and with lubricant, and means actuated by lubricant pressure at the gun for operating the connecting means.

14. In a pressure lubricating gun, a discharge nozzle, a booster pump for supplying lubricant under high pressure to said nozzle, and manually operable means for effecting a lubricant tight connection between said nozzle and an element to be lubricated and for simultaneously tending to reduce the pressure in the pressure cylinder of said booster pump and charging the same with lubricant.

15. In a pressure lubricating gun, a discharge nozzle, a booster pump for supplying lubricant under high pressure to said nozzle, and means operable to effect a lubricant tight connection between said nozzle and an element to be lubricated and for simultaneously drawing a charge of lubricant into the pressure cylinder of said booster pump.

16. In a pressure lubricating gun, a discharge nozzle, a booster pump for supplying lubricant under high pressure to said nozzle, and means operable for clamping said nozzle to an element to be lubricated and for simultaneously tending to expand said pressure cylinder of said booster pump and charging the same with lubricant.

17. In a pressure lubricating gun, a discharge nozzle, a booster pump, having an operating piston, for supplying lubricant under high pressure to said nozzle, means operable by lubricant pressure to effect a lubricant tight connection between said nozzle and an element to be lubricated and for breaking said connection and simultaneously moving said booster pump operating piston to its retracted position.

18. In a pressure lubricating gun, a discharge nozzle, a booster pump for supplying lubricant under high pressure to said nozzle and means operable by the movement of said booster pump to a position at which high pressure on the lubricant may be produced for effecting a lubricant tight connection between said nozzle and an element to be lubricated.

19. In a high pressure lubricant feeding system, a pair of coaxial cylinders of different bores, a pair of unitary coaxial pistons adapted to work in said cylinders, said cylinders having inlet and exhaust ports therein, a casing having ports for supplying air to one cylinder and lubricant to the other, and manual means for causing relative rotation between the cylinders and the casing to control the registry of the corresponding ports.

20. In a high pressure lubricant feeding system, a pair of coaxial cylinders of different bores, a pair of unitary coaxial pistons adapted to work in said cylinders, said cylinders having inlet and exhaust ports therein, a casing having ports for supplying air to one cylinder and lubricant to the other, and manual means for causing relative rotation between the cylinders and the casing to control the registry of the corresponding ports, and means operated by the lubricant piston for closing the lubricant inlet port during the ejecting stroke of said piston.

21. A lubricating device comprising, a pump cylinder, means for supplying lubricant to said cylinder, a piston mounted for reciprocation in said cylinder, a clamp type discharge nozzle communicating with said cylinder, means for rotating said cylinder, and means responsive to the rotation of the cylinder for operating the clamp mechanism of said nozzle to clampingly engage a lubricant receiving fitting.

22. A lubricating device comprising, a pump cylinder, means for supplying lubricant to said cylinder, a piston mounted for reciprocation in said cylinder, a clamp type discharge nozzle communicating with said cylinder, means associated with said piston for rotating said cylinder, and means responsive to the rotation of the cylinder for operating the clamp mechanism of said nozzle to clampingly engage a lubricant receiving fitting.

23. A lubricating device comprising, a pump cylinder, means for supplying lubricant to said cylinder, a piston mounted for reciprocation in said cylinder, a valve for controlling said piston, a manually operable member for actuating said valve and for rotating said cylinder, a clamp type discharge nozzle communicating with said cylinder, and means responsive to the rotation of the cylinder for operating the clamp mechanism of said nozzle to clampingly engage a lubricant receiving fitting.

24. A lubricating device comprising, a barrel, a pump cylinder movably mounted in said barrel, means for admitting lubricant to said cylinder, a piston mounted for reciprocation in said cylinder, means responsive to rotation of said cylinder in said barrel for causing relative longitudinal movement between the cylinder and the barrel, a discharge nozzle of the clamp type communicating with said cylinder, and means responsive to longitudinal movement of said cylinder relative to said barrel for causing said clamp nozzle to clampingly engage a lubricant receiving fitting.

25. A lubricating device comprising, a pump cylinder, means for supplying lubricant to said cylinder, a piston mounted for reciprocation in said cylinder, a discharge nozzle of the relatively movable jaw clamp type communicating with said cylinder, and means for selectively operating said piston and clamping mechanism of said nozzle.

WILLIAM L. MORRIS.